Patented Nov. 8, 1927.

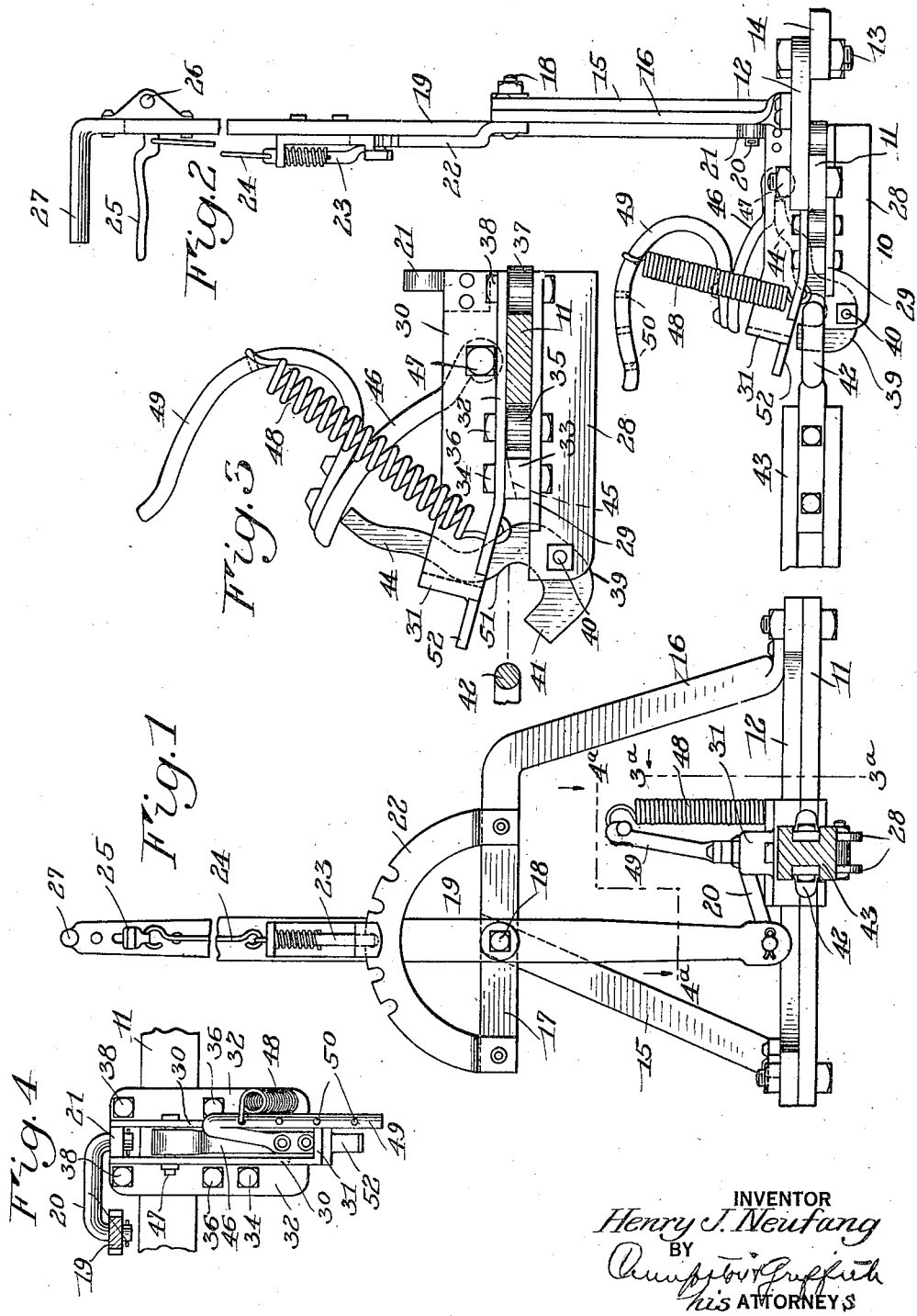

1,648,317

UNITED STATES PATENT OFFICE.

HENRY J. NEUFANG, OF ATLANTA, NEW YORK, ASSIGNOR OF ONE-THIRD TO HYATT C. HATCH AND ONE-THIRD TO BERNIS W. HATCH, BOTH OF ATLANTA, NEW YORK.

COUPLING DEVICE.

Application filed September 2, 1926. Serial No. 133,264.

The present invention relates to a coupling device and has for its object to provide more particularly improved coupling means for cooperation with a draft connection, which may be employed to connect a tractor or other pulling means with various types of farming implements, such as plows, harrows, cultivators and the like to which said coupling device may be conveniently attached.

A further object of the invention is to provide an improved coupling device for connecting plows or other ground working implements with the draft connection of a tractor or the like which is so designed as to afford automatic release of the latter when excessive or abnormal loads are applied thereto, and which after release can be conveniently recoupled upon backing up the tractor to a predetermined position with respect to the coupling device.

A further object of the invention is to provide a coupling device of simple construction embodying comparatively few parts which will be economical to manufacture and highly efficient in operation.

To these and other ends the invention resides in certain improvements and combination of parts all as will be more fully described hereinafter, the novel features being pointed out in the claims at the end of the specification.

In the drawings:

Figure 1 is an end elevation of a coupling device embodying the invention with a draft connection therefor shown in section;

Figure 2 is a side elevation showing the device coupled to a draft connection;

Figure 3 is a sectional elevation taken on line 3ª—3ª of Figure 1; and

Figure 4 is a sectional plan taken on line 4ª—4ª of Figure 1.

Similar reference numerals throughout the several views indicate the same parts.

Referring to the drawings 10 represents generally a frame mounted for back and forth movement upon a horizontally disposed draft bar 11 the ends of which are connected with the opposite ends of a rearwardly extending draft connection 12 adapted to be suitably connected as by a bolt 13 with the forward portion 14 of a ground working implement, not shown, which constitutes a connection for a plow or other implement to which it may be desired to apply the present coupling device. The connection 12 carries a pair of upstanding supports 15 and 16, the latter having a horizontally extending portion 17 connected with the former by a bolt 18 forming a pivot for a lever 19. The lower end of the lever is connected by a link 20 with a lug 21 on the coupler carrying frame 10 whereby means is provided for shifting the coupler to different positions upon the horizontal draft bar 11 in order that the coupler may be properly adjusted with respect to the different implements with which it is used. A notched segment 22 is carried by the arm 17 of the support 16 and is adapted to receive a spring pressed latch bolt 23 having a link 24 extending therefrom and connected with a finger lever 25 for releasing the latch bolt, said lever being pivoted at 26 upon the main operating lever 19 adjacent the hand grip portion 27 thereof as shown in Figure 2.

The frame 10 comprises upper and lower bracket members the latter being in the form of spaced angle bars having vertically disposed portions 28 provided with horizontally extending flanges 29 while the upper bracket member includes vertically disposed sections 30 having a transverse connection 31 adjacent their front ends and also having horizontally disposed flange portions 32 as shown in Figure 4. The bracket members are connected by a cross tie 33 extending therebetween at a suitable point in front of the draft bar 11 and connected with the flanges 29 and 32 by bolts 34. A pair of rollers 35 only one of which is shown, is disposed between the flanges 29 and 30 in position to engage the forward edge of the draft bar 11, said rollers being free to rotate upon bolts 36 extending therethrough and through the flanges of the bracket members. A second pair of rollers is disposed between the flanges pair of rollers is disposed between the flanges in position to engage the rear face of the draft bar 11, one of said rollers being indicated at 37. The last mentioned rollers are carried by bolts 38 extending therethrough and through the rear ends of the flanges 29 and 32. The rollers are adapted to travel upon the vertical faces of the draft bar 11 and serve to guide the coupler carrying frame thereon.

A draft lever by which the frame is coupled to the tractor or other pulling means is indicated at 39 and is pivoted between the vertically disposed sections 28 of the lower bracket and upon a transversely extending bolt 40 connecting the front ends of said sections 28. The lever 39 is provided with an outwardly and vertically extending angular portion 41 adapted to receive the looped end of a draft connection 42 on the rear end of a draft bar 43 which may be connected in any suitable manner with a tractor or other pulling means not shown. The draft lever is provided with a rearwardly extending arm projecting between the vertical sections 30 of the upper bracket member as shown both in Figures 2 and 3 and terminating in a substantially horizontal tail portion 44. In the normal operating position of the lever 39 its rear portion is adapted to lie upon the upper face of the tie member 33 which is cut away at its center as indicated at 45 to form a rest for the lever. A latch or lock member 46 is provided for holding the lever in the position shown in Figure 2 under normal operating conditions. The latch has its rear end pivotally disposed between the vertical sections 30 of the upper bracket upon a bolt 47 extending through and connecting said sections as shown in Figures 3 and 4. The latch is adapted, adjacent to its pivot point, to overlie and engage the horizontally disposed rear end portion of the draft lever and extends upwardly and forwardly from said portion and is adapted to engage the latter in all positions of the same between the extreme positions shown in Figures 2 and 3.

Suitable means is provided for yieldably resisting release of the latch member under normal loads applied to the lever through the pull on the draft connections 42 and 43. This means is in the form of a spring 48 having its lower end connected to one of the flanges 32 of the upper bracket member and the other to a curved arm or handle 49, the inner portion of which is suitably connected with the outer end of the latch 46 as shown in Figure 3. The arm 49 is provided with a series of openings 50 for receiving the hook on the outer end of the spring, the openings being at different distances from the pivot point of the latch so that the further from said point the outer end of the spring is carried the greater the expansion of the spring and consequently the greater the resistance offered to the release of the latch. The latch, under the control of the spring is designed to resist a predetermined load, that is, a certain pull on the draft connection 42—43 sufficient to advance the plow or other implement under ordinary service conditions. However, when the plow strikes an obstruction the resistance of which is greater than that afforded by the latch, the latter will be automatically moved to the position shown in Figure 3 in which the movement of the lever is limited by the connection 31 between the opposite sections 30 of the frame 10. The lever in this position is still maintained in engagement with the latch in position to be reset upon backing up the tractor, in which case the loop 42 will engage the lever at a point 51 thereon and return it to normal position as shown in Figure 2, the angular or hook portion 41 of the lever being forced into the loop and the spring acting at the same time to return the latch to normal position. The arm 49 serves as a handle by which the operator may release the latch for coupling or uncoupling when desired.

The outer end of the upper bracket member is preferably inclined upwardly as shown in Figure 3 to afford ample space between it and the angular portion 41 of the lever for the entrance of the draft loop 42 upon backing up the tractor to effect recoupling as explained above. The flanges 32 are cut away at their front ends at a point slightly in rear of the connection 31 in order to narrow the bracket member at this point for convenience in coupling and uncoupling, and a central portion 52 of the flange is left to form a guide for the loop 42 when being moved into coupling position.

I claim as my invention:

1. A coupling device of the class described comprising a frame, a draft lever pivoted upon the frame and provided with an angularly disposed outer end portion adapted to receive a draft connection and having a rearwardly extending arm terminating in a substantially horizontal tail portion, a latch pivoted upon the frame adjacent the tail portion adapted to engage the latter to resist outward movement of the same and a spring extending transversely of the frame and having one end connected with the forward end of the latter and the other with the latch in advance of its pivot point and adapted to permit release of the latch when an abnormal load is applied to the lever.

2. A coupling device of the class described comprising a frame, a draft lever pivoted upon the frame and provided with an angularly disposed outer end portion adapted to receive a draft member and having a rearwardly extending arm, a forwardly extending latch upon the frame having its rear end pivoted thereon and adapted to engage the rear end of the arm to resist displacement of the lever, a spring adapted to resist outward movement of the latch under normal loads but permitting its release under an abnormal load on the lever and means upon the frame for limiting the movement of the lever upon release thereof whereby said arm will be maintained in engagement with the forwardly extending portion of the latch in extreme release position.

3. A coupling device of the class described comprising a frame, a draft lever pivoted upon the frame and provided with an angularly disposed outer end portion adapted to receive a draft member and having a rearwardly extending arm, a forwardly extending latch pivoted upon the frame adjacent the rear end of the lever arm the latter being adapted to swing in engagement with the latch during movement to and from release position, and yieldable means adapted to prevent release of the latch under normal loads on the lever but permitting its release under abnormal loads.

4. A coupling device of the class described comprising a frame, a draft lever pivoted thereon and provided with an angularly disposed outer end portion adapted to receive a draft connection and having a rearwardly extending arm portion, a forwardly extending latch pivoted upon the frame adjacent the rear end of the arm and adapted to engage the latter in all positions of the lever, an arm extending from the latch and a spring having its inner end connected with the frame and its outer end connected with the arm, said outer end being adjustable to different positions upon the arm whereby to vary the tension of the spring.

5. In a coupling device, a transversely and horizontally disposed draft bar, a frame comprising bracket portions adapted to lie on the upper and lower sides of the bar, spaced connecting members for said bracket portions adapted to engage the vertical faces of the bar to hold the frame against longitudinal displacement, a draft lever pivoted between the bracket portions thereof, the frame having its outer end formed to receive a draft connection and its opposite end extending inwardly upon the frame, a latch pivoted upon the frame adjacent the rear end of the lever adapted to normally hold the lever in operating position and arranged to engage the same in release position and a spring having one end connected with the frame and the other with the latch.

6. In a coupling device of the class described, a draft bar, a frame connected therewith comprising upper and lower sections between which the bar is disposed, said sections each having spaced vertical portions provided with horizontally disposed flanges, means connecting the flanges of the sections, a draft lever pivotally disposed between the vertical portions of the lower section and having its outer end formed to receive a draft connection and its opposite end extending rearwardly between the vertical portions of the upper section, a latch for the lever having its rear end pivoted between the vertical portions of the last mentioned section and adapted to engage the rear end of the lever and yieldable means normally holding the latch in locking position and adapted to permit release of the same under a predetermined load applied to the lever.

7. In a coupling device of the class described, a draft bar, a frame connected therewith comprising upper and lower sections between which the bar is disposed, said sections each having spaced vertical portions provided with horizontally disposed flanges, a tie member between the sections, a draft lever pivotally disposed between the vertical portions of the lower section and having its outer end formed to receive a draft connection and its opposite end extending rearwardly between the vertical portions of the upper section and adapted to rest upon said tie member, a latch for the lever having its rear end pivoted between the vertical portions of the last mentioned section and adapted to engage the rear end of the lever, yieldable means normally holding the latch in locking position and adapted to permit release of the same under a predetermined load applied to said lever, and a stop carried by the upper section for limiting the movement of the lever when released by the latch.

8. A coupling device of the class described comprising a draft bar, a frame including bracket members disposed above and below the draft bar each of the bracket members including spaced portions extending forwardly of the draft bar, means connecting the bracket members at opposite sides of the draft bar, a draft lever pivoted between the spaced portions of one of the bracket members and arranged to extend between the spaced portions of the other bracket member, means on the last mentioned bracket member for limiting movement of the lever when released, a latch pivoted on the last mentioned bracket member for normally holding the lever against release and yieldable holding means for the latch adapted to permit release of the latter when an abnormal load is applied to the lever.

HENRY J. NEUFANG.